US010455225B2

(12) United States Patent
Stoller et al.

(10) Patent No.: US 10,455,225 B2
(45) Date of Patent: Oct. 22, 2019

(54) MULTI-LAYERED DISPLAY WITH INTERSTITIAL LAYER AIR FILTER

(71) Applicant: PURE DEPTH LIMITED, Auckland (NZ)

(72) Inventors: Roland Stoller, Schwabach (DE); Stefan Guellich, Nuremberg (DE); Sven Oliver Kuerschner, Woellstein (DE); James Emslie, Auckland (NZ)

(73) Assignee: PURE DEPTH LIMITED (NZ)

( * ) Notice: Subject to any disclaimer, the term of this patent is extended or adjusted under 35 U.S.C. 154(b) by 238 days.

(21) Appl. No.: 15/594,166

(22) Filed: May 12, 2017

(65) Prior Publication Data

US 2018/0329250 A1 Nov. 15, 2018

(51) Int. Cl.
| | |
|---|---|
| *H04N 13/388* | (2018.01) |
| *G02F 1/1347* | (2006.01) |
| *G02B 27/22* | (2018.01) |
| *H04N 13/395* | (2018.01) |
| *G02F 1/1333* | (2006.01) |

(52) U.S. Cl.
CPC ....... *H04N 13/388* (2018.05); *G02B 27/2278* (2013.01); *G02F 1/1347* (2013.01); *G02F 1/133308* (2013.01); *H04N 13/395* (2018.05); *G02F 1/133385* (2013.01); *G02F 2001/133311* (2013.01); *G02F 2201/36* (2013.01); *H04N 2213/001* (2013.01)

(58) Field of Classification Search
CPC .. G02F 1/13394; G02F 1/1339; G02F 1/1347; H04N 13/395; H04N 13/388; G02B 27/2278
USPC ............................................................ 348/52
See application file for complete search history.

(56) References Cited

U.S. PATENT DOCUMENTS

| | | | |
|---|---|---|---|
| 2009/0128753 A1* | 5/2009 | Shi ................... | G02F 1/133512 349/106 |
| 2011/0085301 A1 | 4/2011 | Dunn | |
| 2012/0255721 A1* | 10/2012 | Kim .................. | G02F 1/133382 165/288 |
| 2016/0154241 A1* | 6/2016 | Alhashim ......... | G02B 27/0172 345/8 |
| 2016/0242329 A1 | 8/2016 | DeMars | |
| 2017/0131558 A1 | 5/2017 | Bell et al. | |

* cited by examiner

*Primary Examiner* — Nguyen T Truong
(74) *Attorney, Agent, or Firm* — Craig A. Baldwin

(57) ABSTRACT

A multi-layer display (MLD) system may include a plurality of display screens including at least first and second display screens arranged in a substantially parallel and overlapping manner, such that an air gap exists between the first display screen and the second display screen. An opening in the enclosure may exist such that air can flow through the opening between the air gap and outside of the enclosure, and a membrane covering the opening, the membrane being porous to air and non-porous to small particulates and water.

18 Claims, 7 Drawing Sheets

MULTI-LAYERED DISPLAY WITH INTERSTITIAL LAYER AIR FILTER

BACKGROUND

This disclosure relates generally to displays and, more particularly, to display systems and methods for displaying images on multi-layer displays.

Multi-layer displays have been developed to display objects with a realistic perception of depth. Multi-layered display (MLD) systems are becoming popular for many applications such as for vehicle dashboards, gaming machines, handheld devices and the like. MLD systems can be configured to display images of scenes so that depth can be represented by distributing objects to be displayed on to the separate display panels of the MLD. Example MLD systems are described in U.S. patent application Ser. No. 15/359,732 filed on Nov. 23, 2016, the contents of which is incorporated herein in its entirety.

The effect of temperature and air pressure upon the space between any two layers of an MLD can affect the construction, quality and/or operation of the display. Therefore techniques are needed for reducing the effect of temperature and air pressure on MLDs.

SUMMARY

Exemplary embodiments provide a display system that can provide visual depth information using a multi-layer display including two or more display screens (e.g., LCDs) and/or layers provided in a stacked arrangement with improved viewability. According to some exemplary embodiments, a multi-layer display (MLD) system may include a plurality of display screens including at least first and second display screens arranged in a substantially parallel and overlapping manner, such that an air gap exists between the first display screen and the second display screen. An opening in the enclosure may exist such that air can flow through the opening between the air gap and outside of the enclosure, and a membrane covering the opening, the membrane being porous to air and non-porous to small particulates and water.

According to another example embodiment, a method of forming a multi-layered display comprises arranging at least first and second display screens in an enclosure in a substantially parallel and overlapping manner such that an air gap exists between the first display screen and the second display screen. The method also includes making an opening in the enclosure such that air can flow through the opening between the air gap and outside of the enclosure, and covering the opening with a membrane, the membrane being porous to air and non-porous to particulates and water.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

MLD systems include multiple separate display screens (also referred to as display layers or display panels). As described in the above incorporated patent application, an observer views a composite image of a scene displayed on the MLD system, whereas the composite image is the visual appearance to the observer of separate images of various portions of the scene displayed on respective display screens of the MLD system. But having multiple display layers can sometimes give rise to interference, such as, for example, moiré interference, caused with respect to some layers.

In most current MLD systems, two LCD layers are arranged with a diffusive interstitial component between them in order to prevent moiré interference. MLD systems typically also have polarizers between the display layers, which also help reduce the negative effects of dust etc. on image quality. With MLD+ type systems, or MLD systems with enhanced transmissivity and imaging characteristics, the two internally facing polarizers are removed (e.g., in order to enhance light transmission through the MLD) which renders the image sensitive to dust between layers. The increased sensitivity to dust arises because the LCD black state relies on perfectly maintaining linear polarization state, and any dust particles contained in the space between the display layers tend to convert this linear polarization state to some other state, and subsequently any dust particles show as bright white particles on the display.

The MLD are typically assembled in a clean room, with each display layer sealed to the spacer between. Thus, dust issues can be avoided at the time of manufacture of the MLD. However, subsequent internal variations in temperature and variations in pressure can sometimes either break the seal(s) allowing dust ingress cause stresses on the LCD resulting in mura (also known as clouding—describing uneven patches of changes in luminance) or perhaps even irreversible damage.

Example embodiments of the present invention solve the problem of maintaining equilibrium of pressure within the layered MLD display stack and ambient air due to large temperature variations in an environments such as, for example, an automotive environment, without the ingress of dust, by a technique including opening a hole in the separation between the display layers to allow air to move freely among the spacing between the display layers and the exterior environment. In example embodiments, a "Tex" spacer (e.g., functional waterproof, windproof and breathable membrane which also prevents dust ingress) is provided to allow free passage of air.

Figure 1:
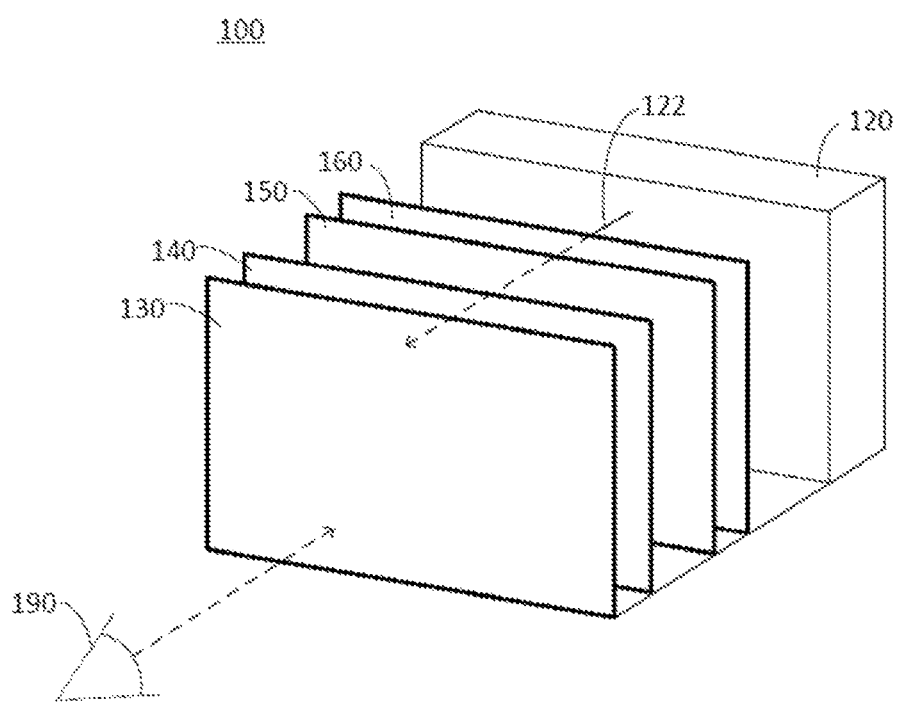
FIG. 1 schematically illustrates a multi-layered display according to some example embodiments of the present disclosure.

FIG. 1 illustrates a MLD system 100 according to some example embodiments of the present disclosure. The display system 100 may include a light source 120 (e.g., rear mounted light source, side mounted light source, optionally with a light guide), and a plurality of display screens 130-160. The display screens 130-160 may be disposed substantially parallel or parallel to each other and/or a surface (e.g., light guide) of the light source 120 in an overlapping manner. In one embodiment, the light source 120 and the display screens 130-160 may be disposed in a common housing or enclosure. It will be understood that, in some example embodiments, MLD 100 may include only two display screens, and may or may not include a light source 120 (e.g., a light source may be external to the housing of the MLD system). The MLD 100 may be provided at the dash of a vehicle in some example embodiments of this disclosure, in order to show the viewer (observer) images such as a speedometer, gauges such as oil pressure or fuel level gauges, navigation, etc. It should be appreciated that the elements illustrated in the figures are not drawn to scale, and thus, may comprise different shapes, sizes, etc. in other embodiments. It should also be appreciated that vehicular dashboard are only one application for MLD systems, and that the use of MLD systems as displays for portable devices, game displays, advertising displays, etc. are contemplated in various embodiments.

In an example application of displaying a three dimensional 3D effect using an MLD system, the MLD system 100 may display graphical information to a viewer/observer 190, such as an operator or passenger of a vehicle, by displaying information including a gradient on two, three, or more of the display screens 130-160 simultaneously. To mimic depth cues of the displayed object, portions of the same object can be displayed with different gradients of a given color or the like on different display screens 130-160. For example, each of the display screen 130-160 may be controlled to display a different portion of a gauge and/or needle found in a traditional vehicle instrument panel. In certain embodiments, each of the display screen 130-160 may be controlled to display a different portion of an image (e.g., clock, gauge and/or needle(s)) of a watch device to be worn in the wrist of a user, or the like.

The light source 120 may be configured to provide illumination for the display system 100. The light source 120 may provide substantially collimated light 122 that is transmitted through the display screens 130-160. Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

Each of the display panels/screens 130-160 may include a liquid crystal display (LCD) matrix. Screens are usually stacked LCD layers within a single pair of cross polarizers on the external facing surfaces if the panels are LCD or just stacked with transparent LED or OLED technologies. The rear most display layer may be a non-transparent technology. The LCD layers may be Twisted Nematic+Film, Vertically aligned, Patterned Vertical Alignment, in plane switching, Transparent OLED, Transparent Direct View Micro LED Displays. Alternatively, the display screens 130-160 may include organic light emitting diode (OLED) displays, transparent light emitting diode (TOLED) displays, cathode ray tube (CRT) displays, field emission displays (FEDs), field sequential display or projection displays. In one example embodiment, the display panels 130-160 may be combinations of either full color RGB, RGBW or monochrome panels. The display screens 130-160 are not limited to the listed display technologies and may include other display technologies that allows for the projection of light. In one embodiment, the light may be provided by a projection type system including a light source and one or more lenses and/or a transmissive or reflective LCD matrix.

In one embodiment, each of the display screens 130-160 may be approximately the same size and have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image may be provided at a different focal plane and depth perceived by the observer 190 in the displayed images. The images may include graphics in different portions of the respective display screen.

U.S. patent application Ser. No. 15/359,732 filed on Nov. 23, 2016, and U.S. application Ser. No. 15/409,711 filed on Jan. 19, 2017, the contents of both of which are incorporated herein in their entirety, describe example MLD that may be used in some example embodiments. U.S. application Ser. No. 15/409,711 describes an example MLD adapted to reduce moire interference.

Figure 2:
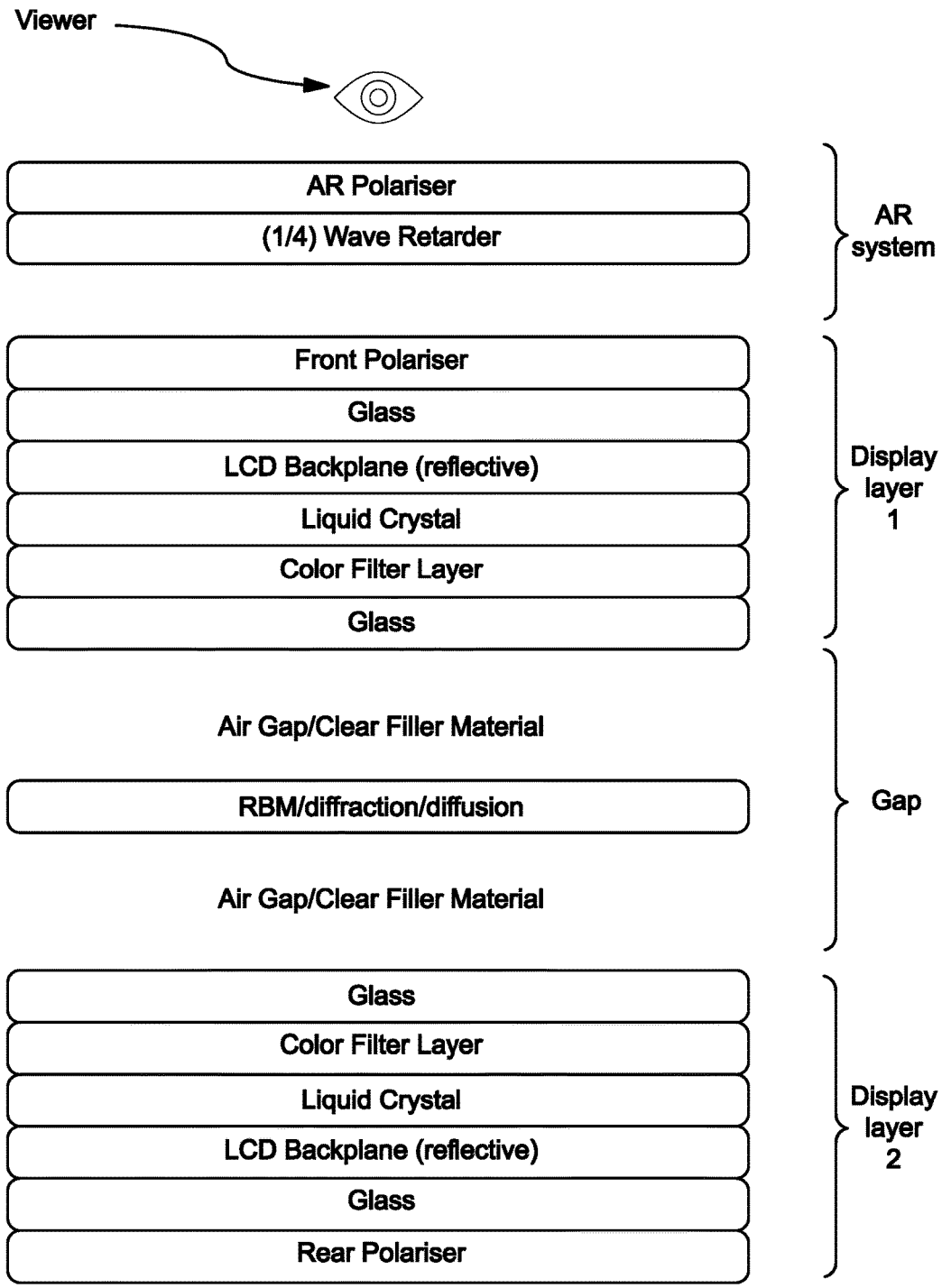
FIG. 2 schematically illustrates is a schematic side cross sectional view of a MLD according to some example embodiments of the present disclosure.

FIG. 2 schematically illustrates a cross-sectional side view of a two display panel MLD 200, according to some example embodiments. For example, the displays shown in FIG. 3 may be the front 1 and rear 2 displays in FIG. 2, respectively. The first display or display layer of the MLD may be element 1 (or 2), and the second display or display layer of the MLD may be element 2 (or 1). Display or display layer 2 is closest to the backlight of the MLD, and it may be desirable to have its backplane facing the backlight system to recycle light that may pass through row drivers, column drivers, transistors, and storage capacitance lines into the backlight. A two polarizer configuration may be used, as shown in the figure, and gaps may be designed to include air or material having birefringence designed to maintain black state of the display when desired. The gap may include material having a refractive index matched closely to glass or the layers on either side to reduce internal reflection and/or depolarization effects. For the front display or display layer 1, its backplane may be oriented opposite to that of display or display layer 2. In particular, for the front display 1 its backplane may be oriented to face the viewer to reduce internal reflections. The color filter layers (each of which may be made up of one or more layers) of the respective displays 1 and 2 may be designed to face each other, with no liquid crystal layer from either display being located between the color filter layers of the first and second displays in certain example embodiments. In certain example embodiments, to reduce external reflections of ambient light, there may be provided an antireflective system at the front made up of an antireflective (AR) polarizer. Additionally, black mask (BM) or other non-reflective material may be added behind the conductive traces of the displays to reduce reflections. Additionally, antireflective (AR) coating(s) may be applied to the interior surfaces in certain example embodiments of this invention. The AR coating may, for example, operate in the visible range, e.g., moth eye, single layer interference, multi-layer interference, etc.

Moiré interference in MLD is commonly suppressed by adding a diffuser element between the back LCD and the observer so that the pixel structure in the back LCD is blurred.

Figure 3:
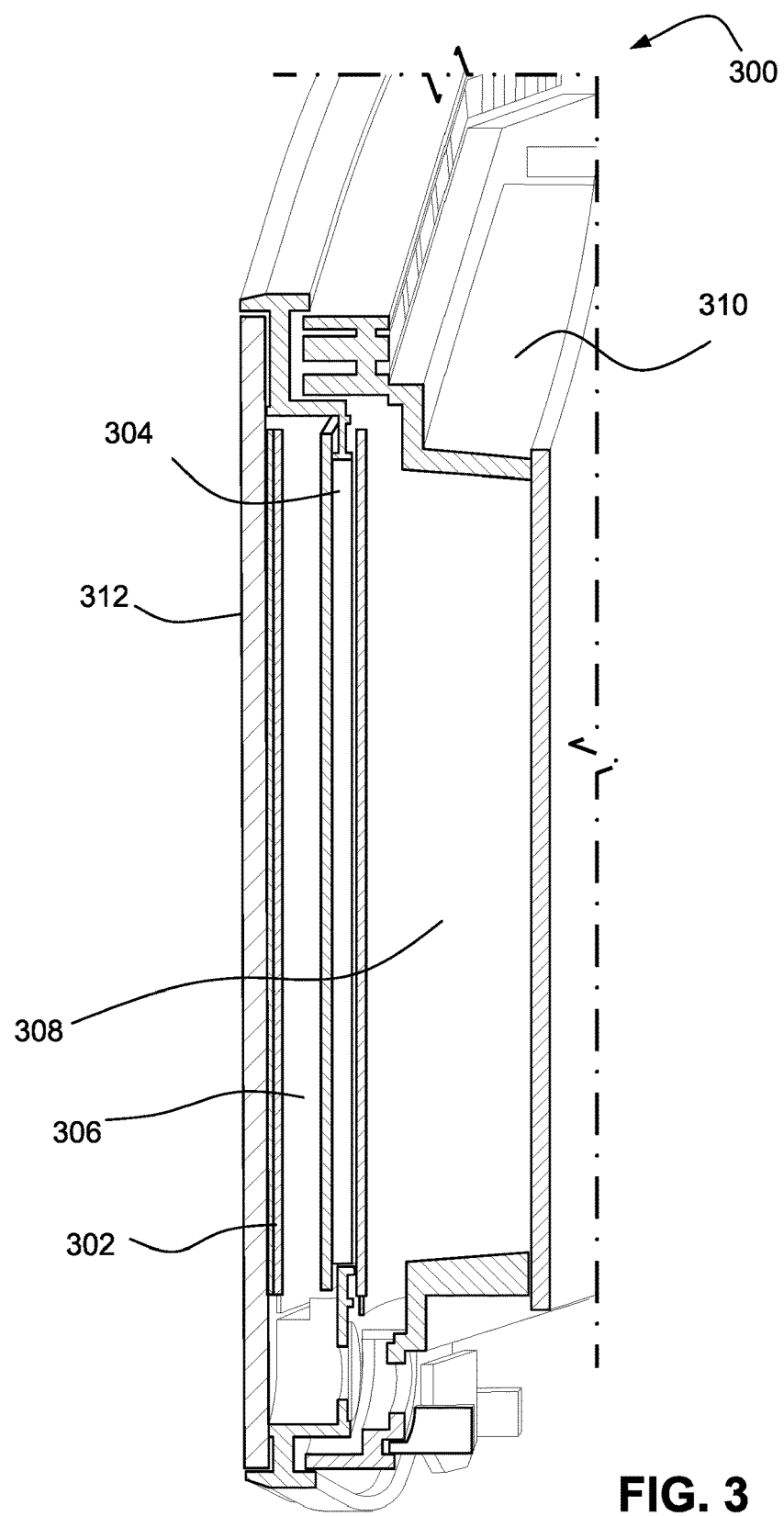
FIG. 3 schematically illustrates a side cross section view of a MLD according to some example embodiments of the present disclosure.

FIG. 3 schematically illustrates a side cross section view of a MLD 300 according to some example embodiments of the present disclosure. The MLD 300 has a front display layer 302 and a rear display layer 304. Display layers 302 and 304 may correspond, for example, to display layer 1 and display layer 2 of the MLD shown in FIG. 2, respectively.

The MLD 300 includes an enclosure 310 which may be constructed from a plastic material, glass material or a combination thereof. The enclosure may be a single component (e.g., a contiguous piece of plastic material), or may be composed of multiple components, and may enclose the multiple display screens and backlight of the MLD on all sides except the front. In the front, the enclosure may attach to a front cover 312 which is arranged in front of the front display 302. In some embodiments front cover 312 may be an integral component of front display 302 (e.g., the front cover may be the display glass itself). Front cover may provide an antiglare, antireflective coating or like function.

Between the display screens 302 and 304, an air gap 306 exists. Similarly, an air gap 308 may exist between 306 and the bottom of the MLD (which may, for example, include a backlight). The air gaps 306 and 308 may be connected to each other (and thus have air flowing from one to another), or may be separated from each other (and thus have no air flowing from one to another).

Figure 4:
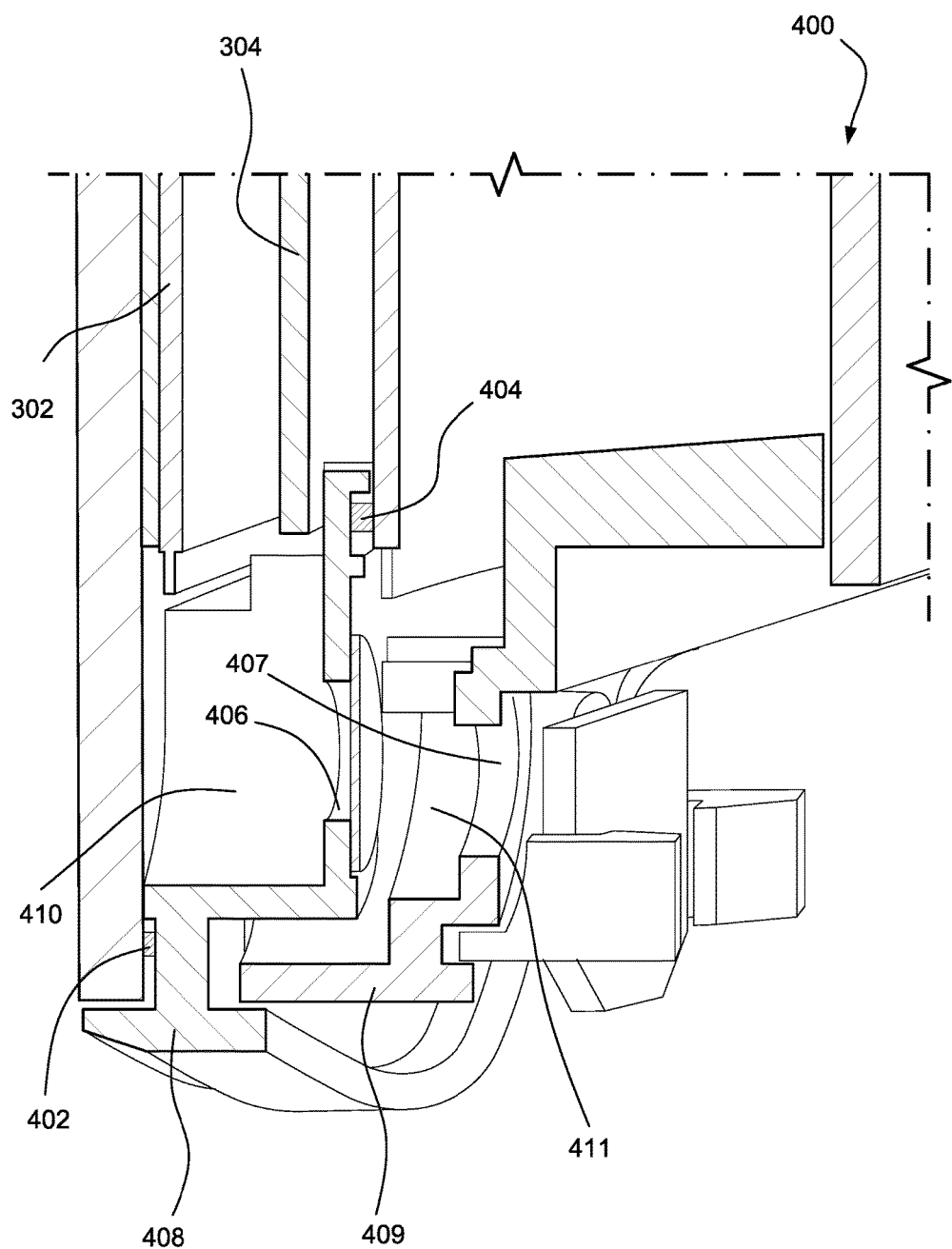
FIG. 4 illustrates a zoomed-in portion of the side view shown in FIG. 3 according to some example embodiments of the present disclosure.

FIG. 4 illustrates a zoomed-in portion 400 of the side view of MLD 300 shown in FIG. 1 according to some example embodiments of the present disclosure. The figure illustrates the use of spacers and seals in the MLD 300, in some embodiments. One or more spacers 408 may be used between the first and second display screens 302 and 304 in order to enforce a spatial separation between them. In FIG. 4, a spacer 408 separates display screens 302 and 304, and another spacer 408 separates display screen 304 from the portion of the MLD 300 below display screen 304. The spacers 406 and 408 may be the same height or different heights. In some embodiments one or more of the spacers 406 and 408 may have an adjustable height.

Sealing 402 provides sealing for the front display 302. Sealing 404 provides sealing for the rear display 304. In some embodiments, each of sealings is made with a material including closed cell foam, rubber, elastomer, neoprene, acrylic adhesive, nitrile, silicone. The sealing 402 may extend throughout the entire edge of the display screen 302. In some example embodiments, the seal may be flexible or hard, can be held to the display, or may be an inlay that is glued. In some embodiments, the sealing may be arranged some small distance inside of the edges of the display screen such that electronic for the display screen can be located in the area outside of the sealing. Similarly, sealing 404 may extend throughout the entire edge of the display screen 304.

The combination of spacers 408 and 409, and sealings 402 and 404 may seal the environment inside the enclosure 310 such that any interaction or exchange of the air inside the enclosure 310 with the environment outside of the enclosure is restricted. In example embodiments, a spacer 408 and seal 402 may seal the air gap 306 such that no air exchange occurs between air gap 306 and outside of air gap 306 except through an opening 406 (described below). Similarly, a spacer 409 and seal 404 may seal the air gap 308 such that no air exchange occurs between air gap 308 and outside of air gap 308 except through openings 406 and 407.

In some embodiments, openings 406 and 407 may include openings between the air gaps 306 and 308, and also between air gaps 306 and 308 and the external environment. One or both of the openings 406 and 407 may be covered with a membrane as described below.

A side view of opening 407 or 406 covered by a membrane (not shown) is shown in FIG. 4. Portions 410 and 411 of spacers 408 and 409 respectively may be configured to provide the openings 406 and 407 connecting the environment outside of MLD 300 enclosure with one or more of the air gaps 306 and 308.

Figure 5:
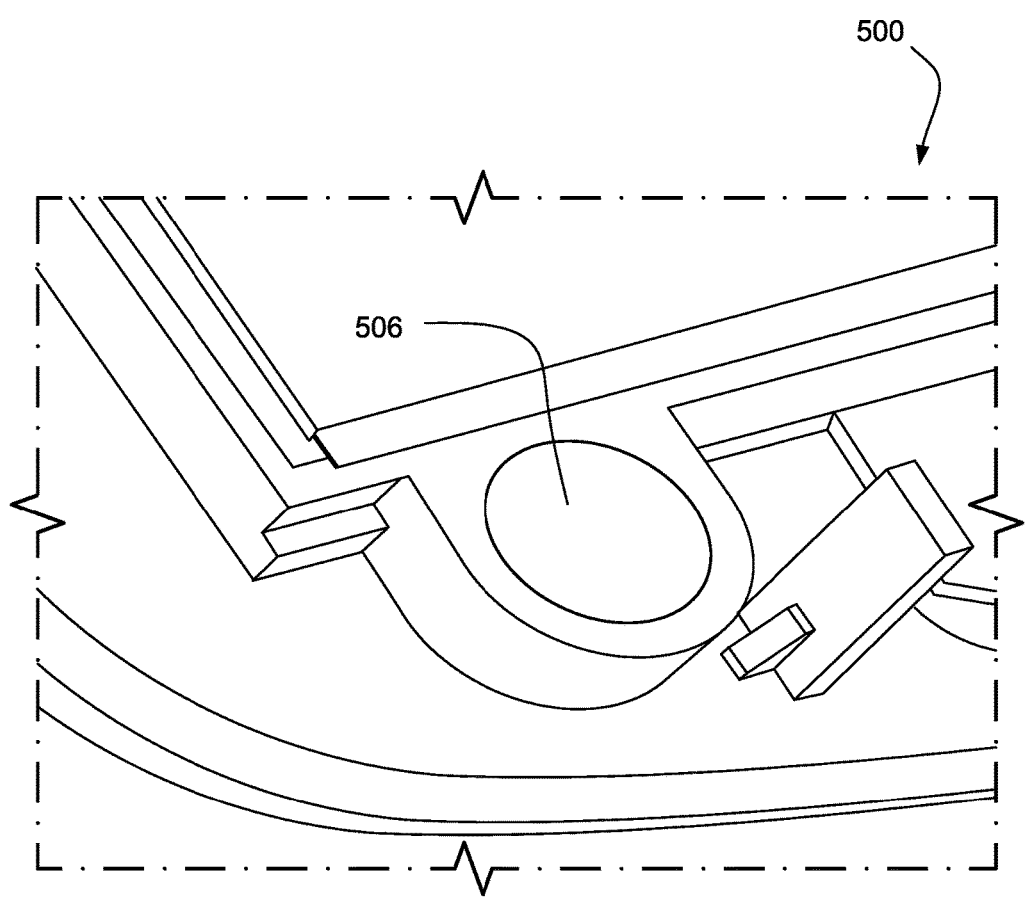
FIG. 5 illustrates a plan view of a portion of the bottom surface of the MLD shown in FIG. 3 showing a membrane covering an opening provided to maintain equilibrium of pressure within the display stack according to some example embodiments of the present disclosure.

FIG. 5 illustrates a plan view of a portion of the bottom surface of the MLD shown in FIG. 3 showing the membrane 506 covering an opening 407 or 406 (not separately shown in FIG. 5) provided to maintain equilibrium of pressure within the display stack according to some example embodiments of the present disclosure. The airflow permitted through the membrane 506 enables pressure balancing in the display stack during temperature changes. For example, as the temperature of the air in air gap 306 increases, and as a result, the air pressure in air gap 306 increases, the openings 406 and/or 407 ensure that the pressure increase does not damage the integrity of the seal 402 and/or spacer 408 (and/or seal 404 and/or spacer 409). Instead, the increase in the pressure, results in air exchange through opening 406 from air gap 306 to outside of the enclosure 300, thus controlling the pressure in the air gap 306 and avoiding any damage to the seals and spacers.

According to an embodiment the membrane is a "Tex" membrane that is a functional waterproof, windproof and breathable membrane. According to another embodiment, the membrane 506 is made of GORE-TEX™. According to another embodiment, the membrane 506 may be constructed from any waterproof, breathable, non-shedding, dust-proof fabric membrane, it may also have an adhesive around the perimeter for complete sealing. The membrane has the property of repelling liquid water while allowing water vapor to pass through. This provides for preventing the entry of water droplets from the outside to the air gap areas, but allowing any moisture generated within the air gaps to be transmitted out. The membrane may be constructed from a micro-mesh of material such as, but not limited to, polytetrafluoroethylene (PTFE), polyetherester and polyurethane.

In the embodiment shown in FIGS. 3-5, the opening is circular. The circular shape of the opening makes it easier to seal the perimeter, with less effect on flow through. According to an embodiment, the opening has a circular shape and a diameter of ~6 mm, yielding sufficient air flow from inside of the display stack to the outside where the display size is ~115 mm×297 mm and a 4 mm separation of between the first display screen and the second display screen. In some embodiments a 5 mm diameter opening is used. However, the opening may be in another shape such as an oval, rectangle, or any other shape that can be effectively covered with a membrane. The size of the opening too may vary, and an optimal size may depend on the volume of the air gaps.

Figure 6:
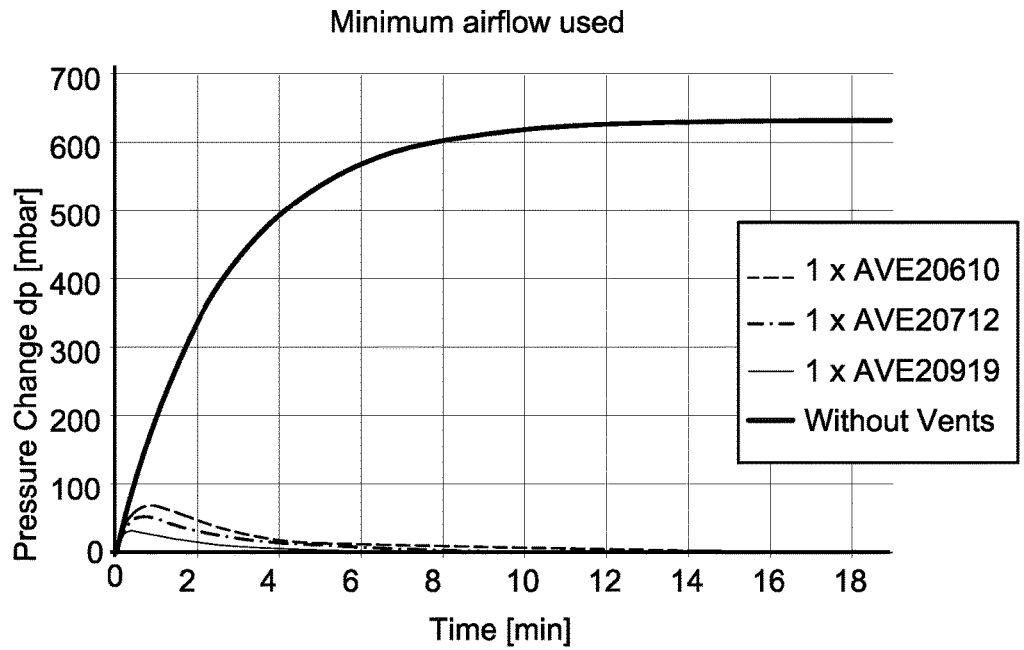
FIG. 6 illustrates a graph showing the pressure variation in the display stack as the temperature is varied, according to some example embodiments of the present disclosure.

FIG. 6 illustrates a graph showing the pressure variation in the display stack as the temperature is varied, according to some example embodiments of the present disclosure. The temperature range is from −40 degrees Celsius to 105 degrees Celsius. As tested, the free inner air volume in the display stack was 202 ml with the total volume being 510 ml. The pressure variation was measured as the heat-up in the air changes from −40 degrees Celsius to 105 degrees Celsius. The opening keeps the internal pressure change well below 50 millibars as the temperature changes. Having too much or too little pressure within the cavity with respect to the ambient pressure will cause stress on the optical and physical components.

Figure 7:
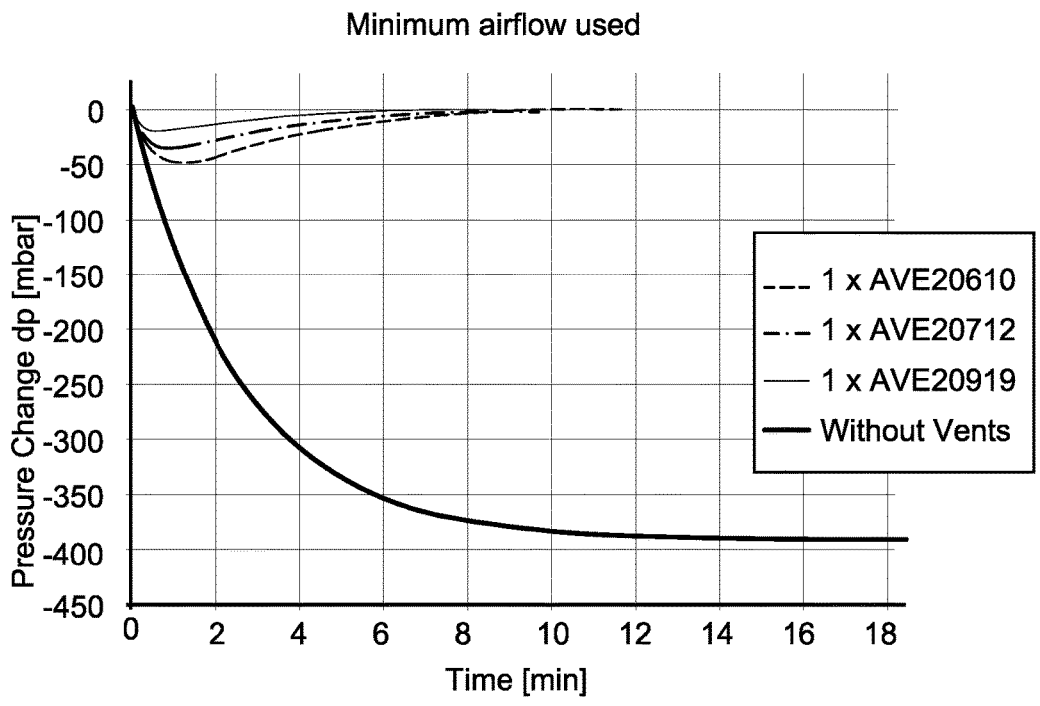
FIG. 7 illustrates a graph showing thermal shock in air as the temperature is varied according to some example embodiments of the present disclosure.

FIG. 7 illustrates a graph showing thermal shock in air as the temperature is varied according to some example embodiments of the present disclosure. The thermal shock was measured as the air cooled down from 105 degrees Celsius to 40 degrees Celsius. Thermal shock occurs when a thermal gradient causes different parts of an object to expand by different amounts. This differential expansion can be understood in terms of stress or of strain, equivalently. At some point, this stress can exceed the strength of the material, causing a crack to form. FIG. 6 shows temperature increases, where a FIG. 7 shows temperature decreases. These pressure differentials between inside the cavity and the ambient air can also be due to a change in altitude, where the ambient conditions change instead.

The behavior shown in FIGS. 6 and 7 of the display stack was observed in an embodiment with a plastic housing for the MLD, and a membrane with minimum airflow of ~40 cubic centimeters per minute of dry air.

From FIG. 6 and FIG. 7, it can be seen that in example embodiments, the pressure difference inside the optical stack is controlled through the entire range of temperature change such that there is no additional risk of mura and no additional mechanical stress occurs for components of the MLD. Mura defects are caused by process flaws usually related to cell assembly, which affect the transmission of light through the display. Excessive air pressure within the display stack and/or thermal shock is likely to cause new, or emphasize existing, mura defects.

Figure 8:
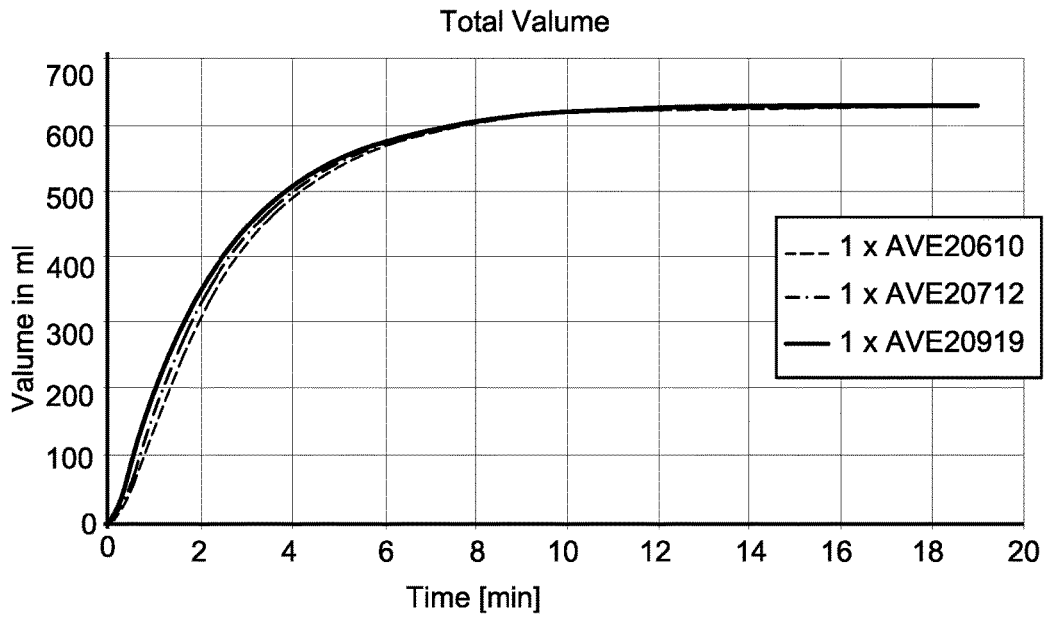
FIG. 8 illustrates a graph showing the airflow over time according to some example embodiments.

FIG. 8 illustrates a graph showing the similar airflow handling of three different membrane materials according to some example embodiments. FIG. 8 shows the airflow volume over time. The porous membrane allows for the pressure inside and outside to be proportionally balanced.

Figure 9:
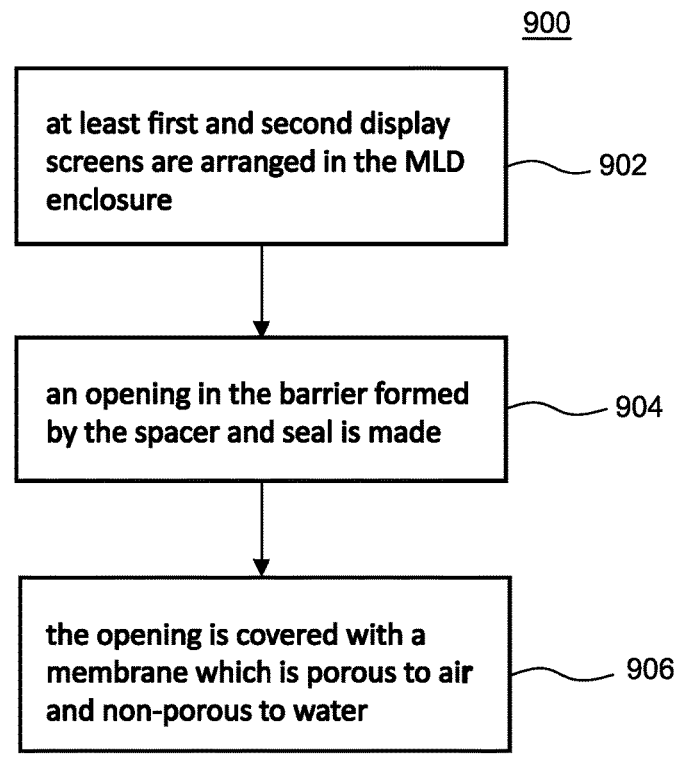
FIG. 9 illustrates a flowchart representing a method forming a multi-layer display system according to some example embodiments of the present disclosure.

FIG. 9 illustrates a process 900 for forming an MLD system according to some example embodiments of the present disclosure. An MLD system formed according to process 900 may have the capability to reduce or altogether eliminate the negative effects such as interference and/or physical damage that can be imposed on the MLD due to the heating up of the air trapped inside of the MLD.

Process 800 may start at step 902. At step 902, at least first and second display screens are arranged in the MLD enclosure in a substantially parallel and overlapping manner such that they are spatially separated with some predetermined distance between them such that an air gap exists between the first display screen and the second display screen.

As described above the first and second display screens can be pressed together with material including spacers and seals surrounding the air gap. The spacer may be made of a harder material such as a plastic or glass, and ensures that the distance between the two screens are the same throughout the area of overlap for the two display screens. The seals prevent air escape from the air gap. The spacers and the seal may form a barrier of a predetermined height and width between the first and second displays screens.

At step 904, an opening in the barrier formed by the spacer and seal is made such that air can flow through the opening between the air gap and outside of the enclosure. In another embodiment the opening may be formed to place in another direction such as for example shown in FIGS. 3-5. For example, in FIGS. 4-5 it is shown that the opening is facing the direction to the rear of the MLD (instead of, for example, being to a side of the MLD). In some embodiments, the opening may extend to one or more other layers and also to the enclosure of the MLD.

The opening may be formed in a circular, rectangular or free form shape. The dimensions of the opening may be configured in order to allow an air exchange. The opening keeps the internal pressure change well below 50 millibars as the temperature changes and or ambient air pressure changes. Having too much or too little pressure within the cavity with respect to the ambient pressure will cause stress on the optical and physical components. In some embodiments, a flexible membrane to adapt the pressure differences. For example, this could be a hold with a piece of rubber or rubber-like material that can expand or contract like a balloon, or even use a flexible sealant. In some embodiments, in small systems there may be no membrane if the volume of air in the air gap is very small.

At step 906, the opening is covered with a membrane which is porous to air and non-porous to water. The membrane has pores that are too small for water droplets or small particulates (e.g., dust) to pass through. Thus the membrane enables exchange of air in order to maintain pressure equilibrium between the display stack of the MLD and the outside, while at the same preventing any dust or water from getting into the display stack and causing interference or physical damage.

After step 906, process 900 has been completed.

In some example embodiments of this invention, there is provided a multi-layered display system for displaying three-dimensional images, comprising at least first and second display screens arranged in an enclosure in a substantially parallel and overlapping manner such that an air gap exists between the first display screen and the second display screen, an opening in the enclosure such that air can flow through the opening between the air gap and outside of the enclosure, and a membrane covering the opening, the membrane being porous to air and non-porous to small particulates and water.

The multi-layer display system of the immediately preceding paragraph, the first and second display screens may be pressed together with a spacer and sealing such that the air gap exists in an area between the first and second display screens and surrounded by the spacer and sealing.

The multi-layer display system of the immediately preceding two paragraphs, wherein except for the opening, the area of the air gap may be sealed by the spacer and the sealing.

The multi-layer display system of the immediately preceding three paragraphs, wherein the spacer and sealing may be applied substantially around edges of at least one of the first and second display screens.

The multi-layer display system of the immediately preceding four paragraphs, wherein the spacer may comprise a plurality of spacing members of a same height such that an even separation exists throughout between the first and second display screens.

The multi-layer display system of the immediately preceding five paragraphs, wherein the opening may be circular.

The multi-layer display system of the immediately preceding six paragraphs, wherein the membrane may be constructed to enable moisture to flow from the air gap to outside the air gap but prevent water from entering the air gap from the outside.

The multi-layer display system of the immediately preceding seven paragraphs, wherein the membrane may be constructed to maintain a maximum pressure differential sufficient to prevent mura appearing.

The multi-layer display system of the immediately preceding eight paragraphs, wherein the membrane may be constructed to maintain a maximum pressure differential sufficient to prevent optical stress and physical stress.

The multi-layer display system of the immediately preceding nine paragraphs, wherein the membrane may be constructed to enable transfer of heat from the air gap to outside the air gap.

The multi-layer display system of the immediately preceding ten paragraphs, wherein the membrane may be constructed of a material including plastic.

The multi-layer display system of the immediately preceding eleven paragraphs, wherein the membrane may be constructed from a material including Gore-Tex™.

The multi-layer display system of the immediately preceding twelve paragraphs, wherein the opening is on the rear side of the enclosure.

The multi-layer display system of the immediately preceding thirteen paragraphs, wherein the first display screen and the second display screen may be sealed to the enclosure with one or more spacers and sealant.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

The invention claimed is:

1. A multi-layer display system for displaying three-dimensional images, comprising:
   at least first and second display screens arranged in an enclosure in a substantially parallel and overlapping manner such that an air gap exists between the first display screen and the second display screen;
   an opening in the enclosure such that air can flow through the opening between the air gap and outside of the enclosure; and
   a membrane covering the opening, the membrane being porous to air and non-porous to small particulates and water;
   wherein the first and second display screens are provided with at least one spacer and a seal therebetween, so that the air gap exists in an area between the first and second display screens and is surrounded by the at least one spacer and seal.

2. The multi-layer display system according to claim 1, wherein, except for the opening, the area of the air gap is sealed by the spacer and the seal.

3. The multi-layer display system according to claim 2, wherein the spacer and seal are applied substantially around edges of at least one of the first and second display screens.

4. The multi-layer display system according to claim 1, wherein the at least one spacer comprises a plurality of spacers of a same height such that an even separation exists throughout between the first and second display screens.

5. The multi-layer display system according to claim 1, wherein the opening is circular.

6. The multi-layer display system according to claim 1, wherein the membrane is constructed to enable moisture to flow from the air gap to outside the air gap but prevent water from entering the air gap from the outside.

7. The multi-layer display system according to claim 1, wherein the membrane is constructed to maintain a maximum pressure differential sufficient to prevent mura appearing.

8. The multi-layer display system according to claim 1, wherein the membrane is constructed to maintain a maximum pressure differential sufficient to prevent optical stress and physical stress.

9. The multi-layer display system according to claim 1, wherein the membrane is constructed to enable transfer of heat from the air gap to outside the air gap.

10. The multi-layer display system according to claim 1, wherein the membrane is constructed of a material including plastic.

11. The multi-layer display system according to claim 1, wherein the membrane is constructed from a material including Gore-Tex™.

12. The multi-layer display system according to claim 1, wherein the opening is on the rear side of the enclosure.

13. The multi-layer display system according to claim 1, wherein the first display screen and the second display screen are sealed to the enclosure with one or more spacers and sealant.

14. A method of forming a multi-layered display, the method comprising:
- arranging at least first and second display screens in an enclosure in a substantially parallel and overlapping manner such that an air gap exists between the first display screen and the second display screen;
- making an opening in the enclosure such that air can flow through the opening between the air gap and outside of the enclosure; and
- covering the opening with a membrane, the membrane being porous to air and non-porous to particulates and water.

15. The method according to claim 14, further comprising pressing the first and second display screens together with a spacer and sealing such that the air gap exists in an area between the first and second display screens and surrounded by the spacer and sealing.

16. The method according to claim 15, wherein, except for the opening, the area of the air gap is sealed by the spacer and the sealing.

17. The method according to claim 16, wherein the spacer and sealing are applied substantially around edges of at least one of the first and second display screens.

18. A multi-layer display system for displaying three-dimensional images, comprising:
- at least first and second displays arranged in a substantially parallel and overlapping manner such that an air gap exists between the first display and the second display;
- an opening provided such that air can flow through the opening between the air gap and an external area;
- a membrane covering the opening, the membrane being porous to air and non-porous to small particulates and water; and
- wherein the first and second displays are provided with at least one spacer and a seal therebetween, so that the air gap exists in an area between the first and second displays and is surrounded by the seal.

* * * * *